United States Patent
Jen

(10) Patent No.: US 6,489,434 B2
(45) Date of Patent: Dec. 3, 2002

(54) MANUFACTURING METHOD OF COPOLYESTER FOR LOW ACETALDEHYDE CONTENT OF PET BOTTLES

(75) Inventor: Zo-Chun Jen, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 09/853,571

(22) Filed: May 14, 2001

(65) Prior Publication Data

US 2002/0094402 A1 Jul. 18, 2002

(30) Foreign Application Priority Data

Jan. 12, 2001 (TW) .................... 090100773 A

(51) Int. Cl.⁷ ................. C08G 63/02; C08K 5/13
(52) U.S. Cl. ............... 528/279; 528/274; 528/275; 528/280; 528/283; 528/285; 528/286; 528/297; 528/302; 528/308; 528/308.6; 524/81; 524/147; 524/323; 524/710; 524/713; 524/783; 524/785
(58) Field of Search ................. 528/274, 275, 528/279, 280, 283, 285, 286, 297, 302, 308, 308.6; 524/81, 147, 323, 710, 713, 783, 785

(56) References Cited

U.S. PATENT DOCUMENTS

| | | |
|---|---|---|
| 4,161,578 A | 7/1979 | Herron |
| 4,223,128 A | 9/1980 | Halek et al. |
| 4,374,975 A | 2/1983 | Duh |
| 4,391,971 A | 7/1983 | Massey et al. |
| 5,573,820 A | 11/1996 | Harazoe et al. |
| 5,597,891 A | 1/1997 | Nelson et al. |
| 5,708,124 A | 1/1998 | Ghatta et al. |
| 5,874,517 A | 2/1999 | Huang et al. |

*Primary Examiner*—Samuel A. Acquah
(74) *Attorney, Agent, or Firm*—Stevens, Davis, Miller & Mosher, LLP

(57) ABSTRACT

The present invention provides a manufacturing method of copolyester for low acetaldehyde content of PET bottles. The polyethylene terephthalate (PET) polymer is added with an appropriate modifier in order to decrease the production of acetaldehyde caused by pyrolysis side reaction during the blow molding process of PET bottles. The modifier comprises stabilizer and primary antioxidant, wherein the stabilizer is an inorganic phosphorous compound with an addition quantity of 0.003~0.5 weight % based on the weight of the total copolyester copolymer and the primary antioxidant is a hindered phenolic antioxidant containing $Ca^{+2}$ with an addition quantity of 0.005~5.0 weight % based on the weight of the total copolyester copolymer. The present invention owns an improving effect of decreasing the production of side product—acetaldehyde at least 30% than those without the addition of said modifier.

8 Claims, No Drawings

MANUFACTURING METHOD OF COPOLYESTER FOR LOW ACETALDEHYDE CONTENT OF PET BOTTLES

DESCRIPTION OF THE PRESENT INVENTION

Field of the Present Invention

The present invention is a manufacturing method of copolyester for low acetaldehyde content of PET bottles. The main skill is to add inorganic phosphorus compound stabilizer and hindered phenol primary antioxidant containing $Ca^{+2}$ into the PET polymer prepared by polyethylene terephthalate polymer and its copolymer in order to decrease the production of acetaldehyde which is caused by the side reaction of PET polymer pyrolysis at least 30% than those without the addition of said modifier.

BACKGROUND OF THE PRESENT INVENTION

While blow molded by the ejector, the polyethylene terephthalate (PET) granules are heated by the high temperature of ejector and are affected by the mechanical force of screw, which causes the pyrolysis of PET polymer. Consequently, the acetaldehyde is produced from side reaction. While the content of acetaldehyde is too high, the PET bottle can be rejected because of the spoiled smell of beverage such as mineral water and cola.

DESCRIPTION OF PRIOR ART

Owning characteristics of lightness, transparency, and safety, the polyethylene terephthalate (PET) bottle has greatly replaced traditional vessels such as glass, aluminum, iron. The PVC plastic bottle is also replaced gradually by the PET bottle owing to its being apt to produce environmental problems such as Dioxin and Acid Rain while treated by combustion.

The manufacturing process of the PET bottle for the prior art can be separated to three main steps:

(1). Melted state polycondensation operation
(2). Solid state polycondensation operation
(3). Blow molded manufacturing operation The three main steps of the prior art are described respectively as follows:

Step (1) "Melted State Polycondensation Operation" can be Further Splitted to two Processes (A). Continuous melted state polycondensation operation
(B). Batch melted state polycondensation operation In the continuous melted state polycondensation operation process, the terephthalic acid (PTA) and the ethylene glycol (EG) are blended to form thick liquid; the isophthalic acid (IPA) 0~10 mol % is added thereafter and blended together and then transmitted to esterification tank so as to perform direct esterification. The operation temperature of esterification is between 220~265.degree.C. The operation pressure of esterification is between normal pressure and 2.0 kg/cm². The produced water and alcohols during said process should be distilled out. While the esterification has completed 95~98% of esterification conversion ratio, the esterification has been stopped and the polycondensation is initiated. A catalyst should be added before polycondensation in order to expedite the rate of polycondensation so as to shorten the polycondensation time. Antimony acetate or antimony trioxide or germanium dioxide or titanium, or their mixture can normally be used as catalyst to expedite the completion of polycondensation. In addition, the stabilizer such as phosphoric acid, phosphorous acid, trimethyl phosphate, triphenyl phosphate, triethyl phosphate is added.

The polycondensation of PET and its copolymer includes pre-polymerization and main-polymerization. The operating temperature for pre-polymerization is between 270~280.degree.C., and the operating vacuum intensity for pre-polymerization is between 250~15 mmHg. The operating temperature for main-polymerization is between 275~285.degree.C., and the operating pressure for main-polymerization is below 1 mmHg. The intrinsic viscosity of PET polymer is raised to 0.5~0.7 dl/g at the end of PET melted state polycondensation. Then, the polymer is unloaded to cooling water for quick cooling-down and further be cut to PET chip with column shape. The residual of acetaldehyde in PET chip at this stage is approximately higher than 50 ppm, which makes the PET chip unsuitable to be directly processed by the blow molder to manufacture PET bottles.

While in the batch melted state polycondensation operation process, the dimethyl terephthalate (DMT) and the ethylene glycol (EG) are blended; then, the transesterification catalyst such as manganese acetate, or zinc acetate, or titanium is added so as to perform transesterification reaction. The operating temperature for transesterification reaction is between 140~260.degree.C. The methyl alcohol should be distilled out during the said process. While the transesterification reaction has completed 95~98% of esterification conversion ratio, the isophthalic acid (IPA) 0~10 mol % is added thereafter and blended together to form copolymer and so as to end the transesterification reaction. A polycondensation type catalyst should be added before melted state polycondensation in order to expedite the rate of polycondensation so as to shorten the polycondensation reaction time. Antimony acetate or antimony trioxide or germanium dioxide or titanium, or their mixture can be used as catalyst to expedite the completion of polycondensation. In addition, the stabilizer such as phosphoric acid, phosphorous acid, trimethyl phosphate, triphenyl phosphate, triethyl phosphate is added.

The polycondensation of PET and its copolymer includes pre-polymerization and main-polymerization. The operating temperature for pre-polymerization is between 270~280.degree.C. and the operating vacuum intensity for pre-polymerization is between 250~15 mmHg. The operating temperature for main-polymerization is between 275~285.degree.C. and the operating pressure for main-polymerization is below 1 mmHg. The intrinsic viscosity of PET polymer is raised to 0.5~0.7 dl/g at the end of PET melted state polycondensation. Then, the polymer is unloaded to cooling water for quick cooling-down and further be cut to PET chip with column shape. The residual of acetaldehyde in PET chip at this stage is approximately higher than 50 ppm, which makes the PET chip unsuitable to be directly processed by the blow molder to manufacture PET bottles.

In order to resolve the problem of excess residual of acetaldehyde in the PET chip produced either by continuous melted state polycondensation or by batch melted state polycondensation mentioned in the said prior art, the present invention adds inorganic phosphorus compound as stabilizer before polycondensation stage; in addition, the present invention adds antioxidant such as hindered phenol containing $Ca^{+2}$ or phosphite or thioether or carbodiimide or dibutylthioamine zinc formate ; moreover, the present invention adds toner such as tetrahydrated cobaltous acetate, cobaltous chloride, and cobaltous nitrate.

The main skill of the present invention is to add inorganic phosphorus compound as stabilizer and hindered phenol primary antioxidant into PET polymer prepared by polyethylene terephthalate polymer and its copolymer in order to reduce the quantity of acetaldehyde produced by the side reaction caused by pyrolysis of PET polymer, which reduces the content of acetaldehyde in PET bottle at least 30% compared with those without the addition of said modifier.

The analysis method of the said intrinsic viscosity:

A Ubelohde viscosity measuring instrument is used to measure the solution prepared by phenol and tetrachloroethane in a 3:2 weight ratio.

Step (2) "Solid State Polycondensation Operation"

The intrinsic viscosity of the PET chip made from Step (1) "Melted state polycondensation operation" is somewhere between 0.5~0.7 dl/g; however, the molecular weight of the PET chip is too low for Step (3) "Blow molded manufacturing operation". Besides, its strength is below enough. Moreover, the residual acetaldehyde in the PET chip is too high to manufacture PET bottles. Consequently, step (2) "solid state polycondensation" is a necessity to raise the intrinsic viscosity of PET chip up to somewhere between 0.72~1.2 dl/g so as to obtain enough molecular weight needed by the succeeding blow molding process and to reduce the residual acetaldehyde in PET chip to below 1 ppm. One of the solid state polycondensation process is the batch process, where the PET chip is heated in a vacuum revolving tank. The other one is the continuous process, where the PET chip is treated by crystallization and dryness, then an inert gas (such as nitrogen gas) is led into the solid state polycondensation tank in order to raise the intrinsic viscosity and to reduce the residual acetaldehyde in PET chip to below 1 ppm.

The solid state polycondensation is operated in an inert gas stream or vacuum environment, the operating temperature of which is between 180~240.degree.C.; in general, the operating temperature is below the melting point of PET and its copolymer to prevent stocking from taking place. In normal circumstance, the PET chip solid state polycondensation for continuous process is operated at the exist of inert gas stream. The inert gas includes nitrogen, carbon dioxide, helium, argon, krypton, xenon gases or their mixture. The helium gas is commonly used as inert gas. The continuous solid state polycondensation reactor includes fluidized bed and moving bed. In most cases, a column shape polycondensation reactor is better to be utilized, wherein the PET chip is transmitted through the reactor in a speed which fits the needed reaction time. The column shape reactor should be high enough to allow the PET chip be transmitted by gravity from the top to the bottom of the reactor in a speed that fits the needed reaction retention time to obtain the required final intrinsic viscosity. The reaction retention time can be controlled by adjusting the effluent at the bottom of the reactor. The inert gas flows upward by counter current through the reactor with a speed better lower than turbulent point so as not to make the PET chip to flow. The PET chip remains the same physical form throughout the overall course of solid polycondensation process.

The representative prior arts of solid state polycondensation are listed as follows:

The U.S. Pat. No. 4,161,578 discloses a continuous solid state polycondensation process, where the crystallinity degree of the PET chip is raised by stirring the pre-crystallization reactor through mechanical force in order to prevent stocking from happening during solid state polycondensation. Meanwhile, the unloading speed of the solid state polycondensation reactor should be at least above 0.25 ft/hr.

The U.S. Pat. No. 4,374,975 discloses a continuous solid state polycondensation process, where the intrinsic viscosity of the PET chip is raised by pre-crystallization and dryness pretreatment. In addition, the inert gas is led into the solid state polycondensation reactor. The solid state polycondensation temperature is somewhere between 200~225.degree.C.

The U.S. Pat. No. 5,708,124 discloses a continuous solid state polycondensation process, where the intrinsic viscosity of the PET chip is raised by leading the helium or the inert gas into the moving bed reactor. The operating temperature of solid state polycondensation is somewhere between 180~230.degree.C. The PET chip should have enough crystallinity degree so as to prevent stocking from happening and should utilize fluidized bed to crystallize.

Step (3) Blow Molder Processes to Produce PET Bottles

The PET chip with high intrinsic viscosity, which has been processed by Step (2) solid state polycondensation, required by blow molding is further processed by the ejector and blow molder to produce transparent PET bottles. The operating temperature of the ejector is somewhere between 260~285.degree.C., where the acetaldehyde content of PET chips is quickly increased by the function of this high temperature and mechanical shear force.

Some prior arts of reducing the acetaldehyde content for PET bottles in Step (3) are listed as follows:

The U.S. Pat. No. 5,597,891 discloses a process of leading the cleaner $N_2$ or vacuum treatment directly to the ejector so as to reduce the acetaldehyde content in PET bottles. However, this disclosure is unfavorably accepted by manufacturers due to its need to modify the ejector. This patent is not concerning about modifying the PET polymer.

The U.S. Pat. No. 4,223,128 discloses a process of using the traditional solid state polycondensation and of analyzing the acetaldehyde quantity produced thereafter in PET chips. This disclosure does not concern about the affection of breakage caused by the mechanical shear force of the ejector screw. Consequently, the results of its analysis are substantially meaningless. Besides, this disclosure does not follow the standard analysis method: Analyzing the content of regenerated acetaldehyde in PET bottles which has been blow molded.

The U.S. Pat. No. 5,573,820 discloses a process of directly leading the polymer obtained from the melted state polycondensation to the ejector to blow mold without the solid state polycondensation process, which emphasizes on reducing the acetaldehyde content in PET bottles to be below 10 ppm by using hot water crystallization process for blow molder. However, an acetaldehyde content of higher than 10 ppm in PET bottles is relatively too high for mineral water and cola therein.

The U.S. Pat. No. 4,391,971 discloses a process of leading the PET polymer through molecular screen adsorbent at a temperature between 230~300.degree.C. in order to reduce the content of regenerated acetaldehyde.

The U.S. Pat. No. 5,874,517 discloses a process of adding the primary antioxidant Irganox-1010 and the secondary antioxidant PEPQ ( Clariant merchandise name is Sandostab PEPQ ) into the melted state PET polymer and its copolymer in order to reduce the regenerated acetaldehyde. However, PEPQ can not be used in PET bottles since it is not approved yet by the US FDA.

The above said processes are not satisfactory particularly in reducing the content of acetaldehyde in PET bottles at Step (3). In order to reduce the by-product acetaldehyde content, the present invention adds an appropriate amount of stabilizer and hindered phenolic antioxidant containing $Ca^{+2}$ so as to obtain the effect of at least more than 30% of reducing the generated quantity of by-product acetaldehyde which is caused by the pyrolysis at Step (3).

The standard testing method of the acetaldehyde content in PET bottles of Coca Cola company:

The PET bottles are blow-filled by nitrogen gas ($N^2$) for twenty after being blow-molded, the outlets of which are sealed. Then, the PET bottles are kept in an environment of room temperature 22±1.5.degree.C. for twenty four hours and drawn the gas therein. The drawn gas is measured by a gas chromatography (GC) so as to obtain the acetaldehyde content.

The type of instrument used in the present invention for measuring the acetaldehyde content is Perkin-Elmer Auto System XL Gas Chromatography Headspace Injector The polyethylene terephthalate and its copolymer used in the present invention are prepared as a pre-polymer by utilizing prior PET manufacturing equipment and process. The process comprises using terephthalic acid (PTA) or dimethyl terephthalate (DMT), and ethylene glycol as initial reagents. In addition, 0~10 mole % isophthalic acid (IPA) is added to perform continuous or batch process. The solid state polymerization is further performed by the use of pre-polymer obtained from said step so as to increase the intrinsic viscosity of the copolymer to 0.72~1.2 dl/g. One of the solid state polycondensation used in the present invention is batch process which performs the solid state polycondensation in a vacuum environment with the addition of PET chips into the revolving tank; the other one is continuous process which leads the inert gas (such as nitrogen gas) into the solid state polycondensation tank, wherein the PET chips have been crystallized and dried, to increase the intrinsic viscosity of PET copolymer to somewhere between 0.72~1.2 dl/g.

The present invention is to provide a manufacturing method of PET chips for low acetaldehyde content of PET bottles, which is composed substantially by dicarboxyl acid and dihydric alcohol. The reaction takes place at a temperature which is appropriate for performing esterification or transesterification and makes the conversion ratio to between 95~98%. In addition, the catalyst, toner, stabilizer, and hindered phenol antioxidant are added before polycondensation. The melted state polycondensation is performed under vacuum environment. The intrinsic viscosity value of PET chips is controlled between 0.50~0.72 dl/g.

According to the above said centents:

(1) Dicarboxyl acid comprises Terephthalic acid (PTA), Isophthalic acid (IPA), Dimethyl terephthalate (DMT), 2,6-naphthalenedicarboxylic acid (NDA), Dimethyl 2,6-naphthalenedicarboxylate.

(2) Dihydric alcohol comprises Ethylene glycol, propylene glycol, 1,3-propylene glycol, 1,4-butanediol, 1,4-cyclohexanedimethanol (CHDM ).

(3) As said in (1)and (2), the mole ratio of dicarboxyl acid and dihydric alcohol is 1:1. The other said dicarboxyl acid or dihydric alcohol also can be added in order to prepare copolyester copolymer. At least 80 mole % of the component should be terephthalic acid or 2,6-naphthalenedicarboxylic acid or dimethyl terephthalate or dimethyl 2,6-naphthalenedicarboxylate.

(4) The catalyst comprises antimony acetate, antimony trioxide, germanium dioxide, titanium, manganese acetate, zinc acetate. Based on the weight of copolyester, the catalyst metal element manganese is between 0~300 ppm or titanium is between 0~80 ppm or titanium is between 0~300 ppm or germanium is between 0~200 ppm.

(5) The stabilizer comprises phosphoric acid, phosphorous acid, trimethyl phosphate, triphenyl phosphate, triethyl phosphate. Based on the weight of copolyester, the phosphorus element content is between 5~100 ppm, preferably 37.6 ppm.

(6) The hindered phenolic antioxidant is Irganox-1425 (Ciba merchandise name). Based on the weight of copolyester, the calcium element is between 5~100 ppm, preferably 17.3 ppm.

(7) The toner comprises tetrahydrated cobaltous acetate, cobaltous chloride, cobaltous nitrate, salicyl cobaltous salicylate. Based on the weight of copolyester, the cobalt element content is between 0~100 ppm.

EXAMPLES

The following examples are given to illustrate but not to limit the invention.

Example 1

The terephthalic acid and ethylene glycol are blended to form thick liquid and then transmitted to esterification tank. The thick liquid is heated to 260.degree.C. at an absolute pressure of 2.0 kg/cm$^2$ to perform esterification. When the esterification conversion ratio reaches over 95% and before the polycondensation, the polycondensation catalyst-antimony acetate and the toner-tetrahydrated cobaltous acetate are added into the reaction tank. Then, the reactor is vacuumed to below 1 mmHg. The first stage polycondensation is performed at 270.degree.C. followed by the second stage polycondensation at 280.degree.C. so as to produce the pre-polymer with a controlled intrinsic viscosity at somewhere between 0.60~0.64 dl/g. Based on weight of the polyethylene terephthalate polymer, the antimony element content in catalyst- antimony acetate is 183.15 ppm and the cobalt element content in tonertetrahydrated cobaltous acetate is 34.27 ppm.

The pre-polymer obtained from above is cut to be chips which are then dryed and crystallized for six hours at a temperature below 180.degree.C. and are transmitted to the solid state polycondensation reactor thereafter. The reaction temperature for solid state polycondensation is 225.degree.C. and the reaction time is 20 hours. The intrinsic viscosity is controlled between 0.76~0.86 dl/g after the completion of solid state polycondensation.

The polyester chips which have completed solid state polycondensation are processed to PET bottles by the ejector at 280.degree.C. Further, the PET bottles are blown by nitrogen gas for 20 seconds and sealed and placed in an environment with a room temperature of 22±1.5.degree.C. for 24 hours. The gas in PET bottles is drawn thereafter and measured by GC; the acetaldehyde content is 6.50 ppm.

Example 2

Repeat the process of Example 1. Based on the copolymer, the isophthalic acid 2.7 mole % is added into the thick liquid formed by blending terephthalic acid and ethylene glycol. The stabilizer-phosphoric acid is added before polycondensation taking place. Based on the weight of copolymer, the content of phosphorus element is 37.6 ppm. The acetaldehyde content measured by GC is 3.95 ppm.

Example 3

Repeat the process of Example 1. Based on the copolymer, the isophthalic acid 2.7 mole % is added into the thick liquid formed by blending terephthalic acid and ethylene glycol. The primary antioxidant-Irganox 1425 is added before polycondensation taking place. Based on the weight of copolymer, the content of calcium element is 17.3 ppm. The acetaldehyde content measured by GC is 5.60 ppm.

Example 4

Repeat the process of Example 1. Based on the copolymer, the isophthalic acid 2.7 mole % is added into the thick liquid formed by blending terephthalic acid and ethylene glycol. The stabilizer-phosphoric acid and the primary antioxidant-Irganox 1425 are added before polycondensation taking place. Based on the weight of copolymer, the content of phosphorus element is 37.6 ppm. Based on the weight of copolymer, the content of calcium element is 17.3 ppm. The acetaldehyde content measured by GC is 2.75 ppm.

What is claimed is:

1. A manufacturing method of copolyester for low acetaldehyde content of PET bottles, whose characteristic is to add 0~10 mole % isophthalic acid into the dicarboxyl acid component and the dihydric alcohol component repeat unit so as to have the dicarboxyl acid component and the dihydric alcohol component complete over 95% of esterification conversion ratio; the catalyst, stabilizer, toner, and hindered phenolic antioxidant having a structure containing calcium and phosphorous elements, wherein the calcium element is in the amount of 2–200 ppm based on the weight of the polyester, are then added to form copolymer which is further manufactured to PET bottles.

2. A manufacturing method of copolyester for low acetaldehyde content of PET bottles as defined in claim 1, wherein at least 80 mole % is terephthalic acid or 2,6-naphthalenedicarboxylic acid.

3. A manufacturing method of copolyester for low acetaldehyde content of PET bottles as defined in claim 1, wherein at least 80 mole % is dimethyl terephthalate or dimethyl 2,6-naphthalenedicarboxylate.

4. A manufacturing method of copolyester for low acetaldehyde content of PET bottles as defined in claim 1, wherein the stabilizer is phosphoric acid; and based on the weight of copolymer, the content of phosphorus element is between 5~100 ppm.

5. A manufacturing method of copolyester for low acetaldehyde content of PET bottles as defined in claim 1, wherein the toner is tetrahydrated cobaltous acetate; and based on the weight of nopolyester, the content of cobalt element is between 0~100 ppm.

6. A manufacturing method of copolyester for low acetaldehyde content of PET bottles as defined in claim 1, wherein the catalyst metal element comprises 0~300 ppm of manganese or 0~80 ppm of titanium or 0~300 ppm of antimony or 0~200 ppm of germanium.

7. A polyester resin used for at least reduction of 30% regenerated acetaldehyde in the manufacturing of PET bottle, said resin comprising:

at least 70 mole % ethylene terephthalate;

0–10 mole % isophthalic acid;

an antioxidant compound with a hindered phenol structure containing calcium and phosphorus element, wherein said calcium element of the antioxidant is 2~200 ppm based on weight of said polyester; and a phosphoric acid as a stabilizer, wherein said phosphorus element of phosphoric acid is 5~100 ppm based on weight of polyester.

8. The polyester resin of claim 7, wherein said stabilizer compound is phosphoric acid.

* * * * *